US009874328B2

(12) United States Patent
Kolstee et al.

(10) Patent No.: US 9,874,328 B2
(45) Date of Patent: Jan. 23, 2018

(54) HEADLAMP WITH LENS REFLECTOR SUBASSEMBLY

(71) Applicants: Todd Kolstee, North Clymer, NY (US); Alan Felmlee, Russell, PA (US); Douglas Buffone, Jamestown, NY (US); Nicholas Kenyon, Sherman, NY (US); Ryan Smith, Lakewood, NY (US)

(72) Inventors: Todd Kolstee, North Clymer, NY (US); Alan Felmlee, Russell, PA (US); Douglas Buffone, Jamestown, NY (US); Nicholas Kenyon, Sherman, NY (US); Ryan Smith, Lakewood, NY (US)

(73) Assignee: Truck-lite Co., LLC, Falconer, NY (US)

( * ) Notice: Subject to any disclaimer, the term of this patent is extended or adjusted under 35 U.S.C. 154(b) by 0 days.

(21) Appl. No.: 14/863,546

(22) Filed: Sep. 24, 2015

(65) Prior Publication Data
US 2016/0084460 A1 Mar. 24, 2016

Related U.S. Application Data

(60) Provisional application No. 62/054,979, filed on Sep. 24, 2014.

(51) Int. Cl.
F21S 8/10 (2006.01)
F21V 31/00 (2006.01)
B60Q 1/00 (2006.01)

(52) U.S. Cl.
CPC ........ *F21S 48/1159* (2013.01); *B60Q 1/0035* (2013.01); *B60Q 1/0041* (2013.01); *F21S 48/1109* (2013.01); *F21S 48/1305* (2013.01); *F21S 48/137* (2013.01); *F21S 48/328* (2013.01); *F21V 31/00* (2013.01)

(58) Field of Classification Search
CPC .............. F21S 48/1159; F21S 48/1109; F21S 48/1305; F21S 48/137; F21S 48/321; F21S 48/328; B60Q 1/0035; B60Q 1/0041; F21V 31/00; F21V 31/005
See application file for complete search history.

(56) References Cited

U.S. PATENT DOCUMENTS

| 6,062,714 | A  | 5/2000  | Serizawa et al.   |
| 6,561,679 | B1 | 5/2003  | Erion et al.      |
| 6,736,532 | B2 | 5/2004  | Crawley et al.    |
| 6,945,672 | B2 | 9/2005  | Du et al.         |
| 6,976,769 | B2 | 12/2005 | McCullough et al. |

(Continued)

Primary Examiner — Alan Cariaso
(74) Attorney, Agent, or Firm — The Bilicki Law Firm, PC; Byron A. Bilicki; Rebecca M. Tapscott

(57) ABSTRACT

A headlamp includes heat sink structure for positioning a light emitting diode at an angle offset from the longitudinal axis of the headlamp and a reflector lens subassembly including a reflector portion and a light transmissive portion. The reflector portion includes a reflective surface for directing light from the light emitting diode towards the light transmissive portion. The reflector lens subassembly includes an upper rim with alignment features for engaging the perimeter of the heat sink structure to define a sealed three-dimensional space within the headlamp and to facilitate positioning of the light emitting diode with respect to the reflector lens subassembly.

20 Claims, 6 Drawing Sheets

(56) References Cited

U.S. PATENT DOCUMENTS

| | | | |
|---|---|---|---|
| 7,048,412 B2 * | 5/2006 | Martin | F21K 9/00 362/247 |
| 7,070,310 B2 * | 7/2006 | Pond | B60Q 1/04 362/516 |
| 7,344,289 B2 | 3/2008 | Fallahi et al. | |
| 7,377,665 B2 | 5/2008 | Langenwalter | |
| 7,553,054 B2 | 6/2009 | Yagi | |
| 7,585,096 B2 | 9/2009 | Fallahi et al. | |
| 7,635,206 B2 * | 12/2009 | Huang | F21S 48/1159 362/249.02 |
| 7,682,049 B2 | 3/2010 | Zheng et al. | |
| 7,740,783 B2 | 6/2010 | Ishizawa et al. | |
| 7,824,076 B2 | 11/2010 | Koester | |
| 8,172,441 B2 | 5/2012 | Ishida | |
| 8,314,559 B1 | 11/2012 | Helms et al. | |
| 8,367,200 B2 | 2/2013 | Sato et al. | |
| 8,405,325 B2 | 3/2013 | Inoko et al. | |
| 8,575,839 B2 | 11/2013 | Inoue et al. | |
| 8,596,841 B2 * | 12/2013 | Yagi | F21S 48/1159 362/509 |
| 8,616,741 B2 | 12/2013 | Ookubo | |
| 8,721,130 B2 | 5/2014 | Uchida | |
| 8,742,676 B2 | 6/2014 | Taubert | |
| 8,746,939 B2 | 6/2014 | Williams et al. | |
| 8,760,071 B2 | 6/2014 | Taubert | |
| 8,766,540 B2 | 7/2014 | Harnana et al. | |
| 8,816,604 B2 | 8/2014 | Carli | |
| 8,833,990 B2 | 9/2014 | Tessnow et al. | |
| 8,840,278 B2 | 9/2014 | Pickard | |
| 8,840,291 B2 | 9/2014 | Meyer-Wendt et al. | |
| 8,851,707 B2 | 10/2014 | Peck | |
| 8,851,723 B2 | 10/2014 | Peck et al. | |
| 8,936,378 B2 * | 1/2015 | Li | F21S 48/1154 362/218 |
| 8,950,912 B2 | 2/2015 | Chen | |
| 2012/0064370 A1 | 3/2012 | Tanifuji et al. | |
| 2014/0078769 A1 | 3/2014 | Ookubo | |
| 2014/0362569 A1 | 12/2014 | Peck | |
| 2015/0023041 A1 | 1/2015 | Peck et al. | |
| 2015/0036374 A1 | 2/2015 | Yasuda | |
| 2015/0369443 A1 * | 12/2015 | Chang | F21S 48/1104 362/516 |

* cited by examiner

HEADLAMP WITH LENS REFLECTOR SUBASSEMBLY

SUMMARY

Figure 1:
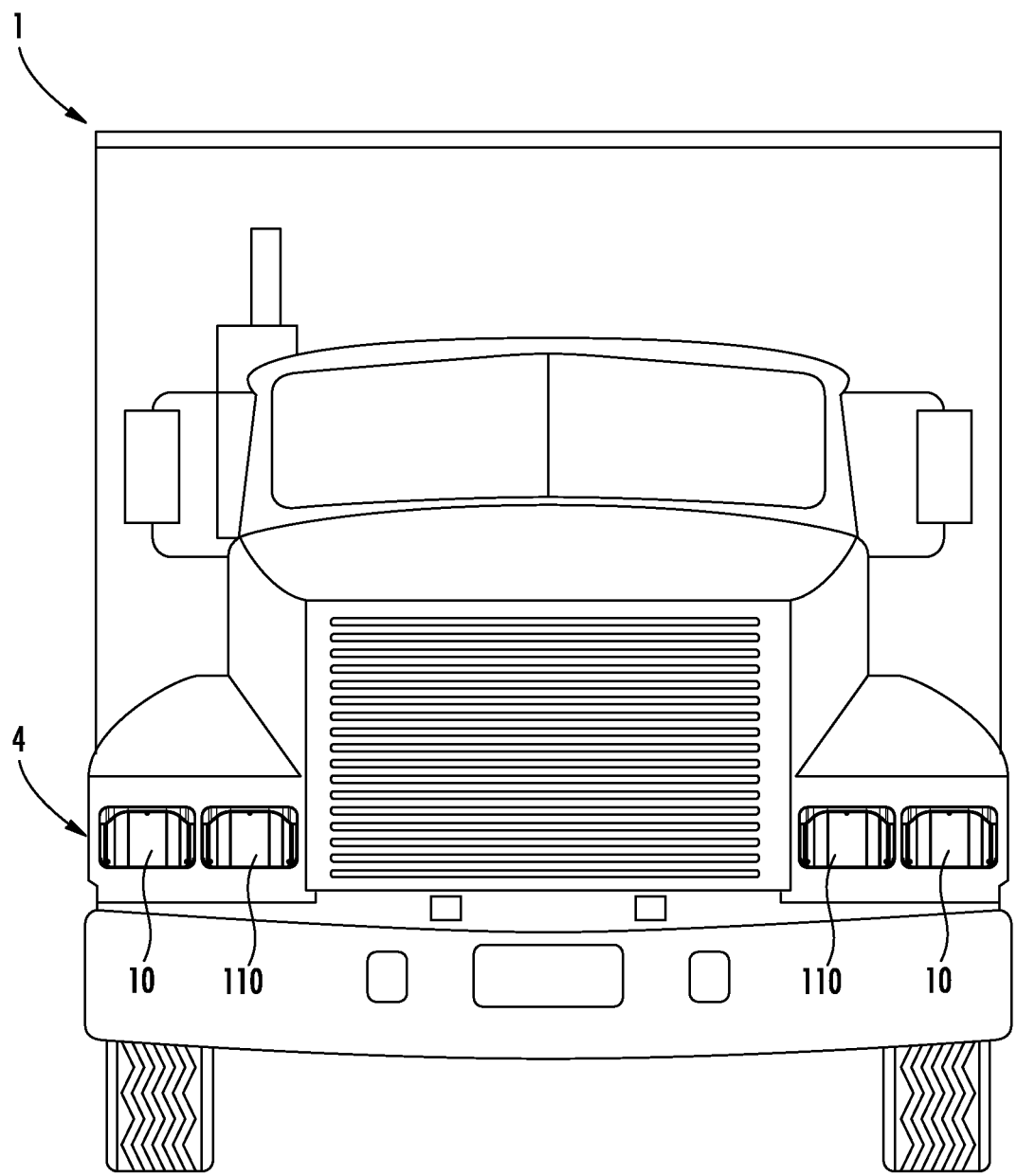
FIG. 1 is a diagrammatic, front-end view of a vehicle provided with a light emitting diode headlamp assembly according to one embodiment of the present invention.

A headlamp includes a light emitting diode, a circuit board electrically connected to the light emitting diode, a heat sink structure including an outer side, an inner side, a first edge, a second edge and a perimeter. The inner side includes a wedge formed thereon for positioning the light emitting diode at an angle offset from the horizontal axis of the headlamp by approximately 15 degrees.

The headlamp also includes a reflector lens subassembly including a reflector portion and a light transmissive portion. The reflector portion includes a reflective surface for directing light from the light emitting diode towards the light transmissive portion. The reflector lens subassembly includes an upper rim with alignment features for engaging the perimeter of the heat sink structure to define a sealed three-dimensional space within the headlamp and to facilitate positioning of the light emitting diode with respect to the reflector lens subassembly.

DETAILED DESCRIPTION

For the purpose of promoting an understanding of the present invention, references are made in the text hereof to embodiments of a low beam and high beam light emitting diode headlamp and headlamp assembly, some of which are illustrated in the drawings. It is nevertheless understood that no limitations to the scope of the invention are thereby intended. One of ordinary skill in the art will readily appreciate that modifications such as these involving the shape of the low and high beam headlamps, type or number of light emitting diodes do not depart from the spirit and scope of the present invention. Some of these possible, modifications are mentioned in the following description. In the embodiments depicted, like reference numerals refer to identical structural elements in the various drawings.

FIG. 1 is a diagrammatic, front-end view of a heavy-duty vehicle, such as a truck, 1 having a headlamp assembly 4, In the embodiment shown, headlamp assembly 4 is a four (4) inch by six (6) inch, quad headlamp package. Accordingly, as shown here, headlamp assembly 4 comprises four individual sealed headlamps: two (2) low beam headlamps, each indicated at 10, and two (2) high beam headlamps, each indicted at 110, each of the four individual headlamps utilizing light emitting diodes as a light source, In the embodiment shown in FIG. 1, and as described herein, headlamps 10 function as low beam headlamps that satisfy the photometric, dimensional, color and other requirements for low beam headlamps. Similarly, headlamps 110 function as high beam headlamps that satisfy the photometric, dimensional, color and other requirements for high beam headlamps. For example, in the embodiment shown here, low beam headlamps 10 and high beam headlamps 110 are rectangular in shape and approximately four (4) inches by six (6) inches. One of ordinary skill in the art will readily appreciate, however, that a sealed-beam headlamp assembly according to the instant invention can also comprise combined low/high beam headlamps with alternate shapes and/or dimensions.

Referring further to FIG. 1, in an embodiment of the quad headlamp assembly, two (2) headlamps 10 are operatively arranged as the two outer headlamps of headlamp assembly 4 to perform the low beam function and two (2) headlamps 110 are operatively arranged as the two inner headlamps of headlamp assembly 4 to perform the high beam function. Each low beam headlamp 10 and each high beam headlamp 110 is a separate unit with a separate housing that is mounted individually to the front end of vehicle 1, thereby forming headlamp assembly 4. In general, quad headlamp assemblies are known in the art, as described in U.S. Pat. No. 7,070,310, which is incorporated herein by reference.

According to embodiments of the invention low and high beam headlamps 10 and 110 only differ in the optical prescription of the lens that distributes the light appropriately to satisfy SAE requirements. Therefore, only headlamp 10 will be described in detail, but it should be understood that the disclosure is equally applicable to headlamp 110.

Figure 2:
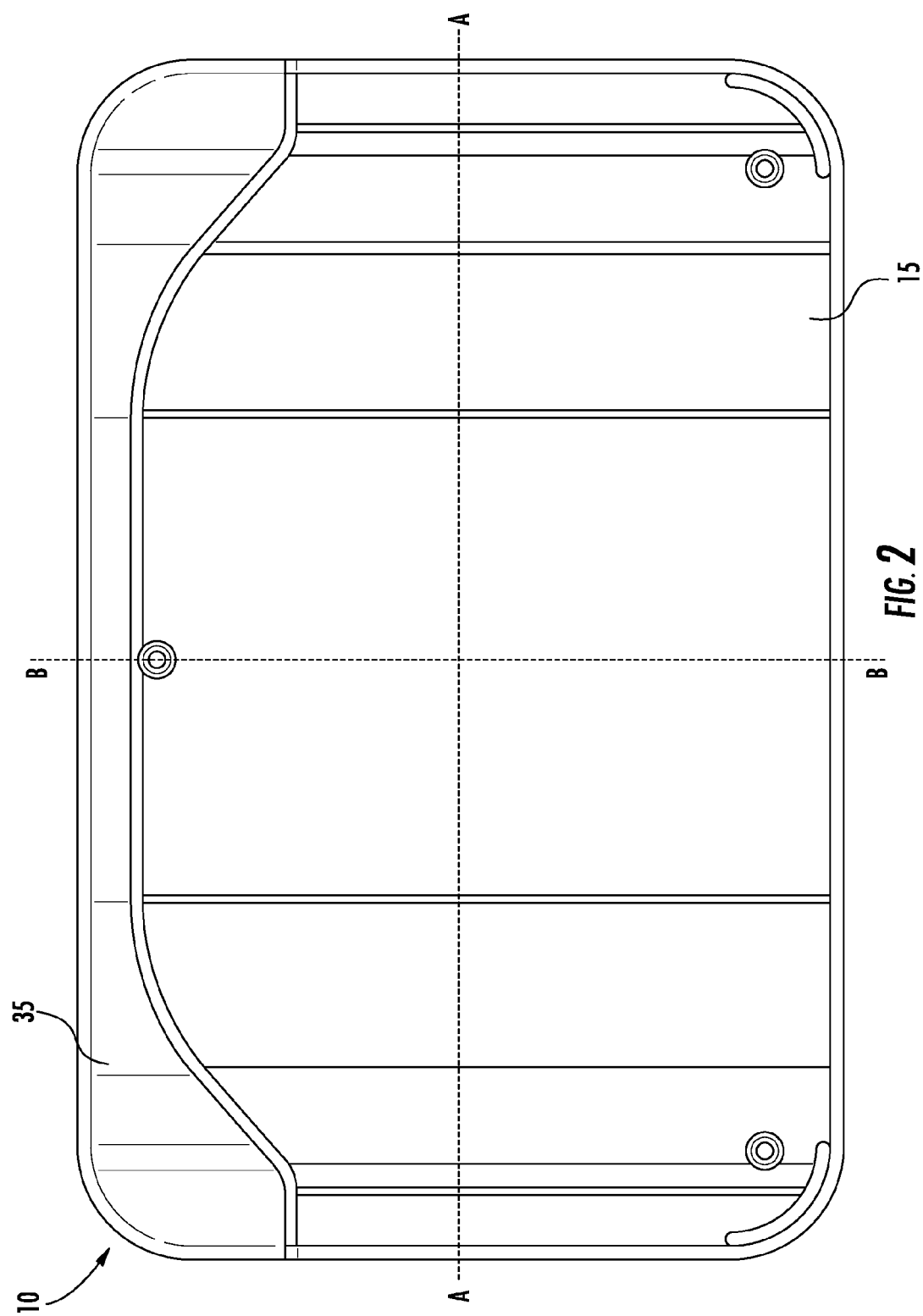
FIG. 2 is a front view a headlamp according to an embodiment of the invention.

FIG. 2 is a front view of headlamp 10 according to an embodiment of the invention. Vertical axis of headlamp 10 is defined as line B-B, and horizontal axis of headlamp 10 is defined as line A-A.

Figure 3:
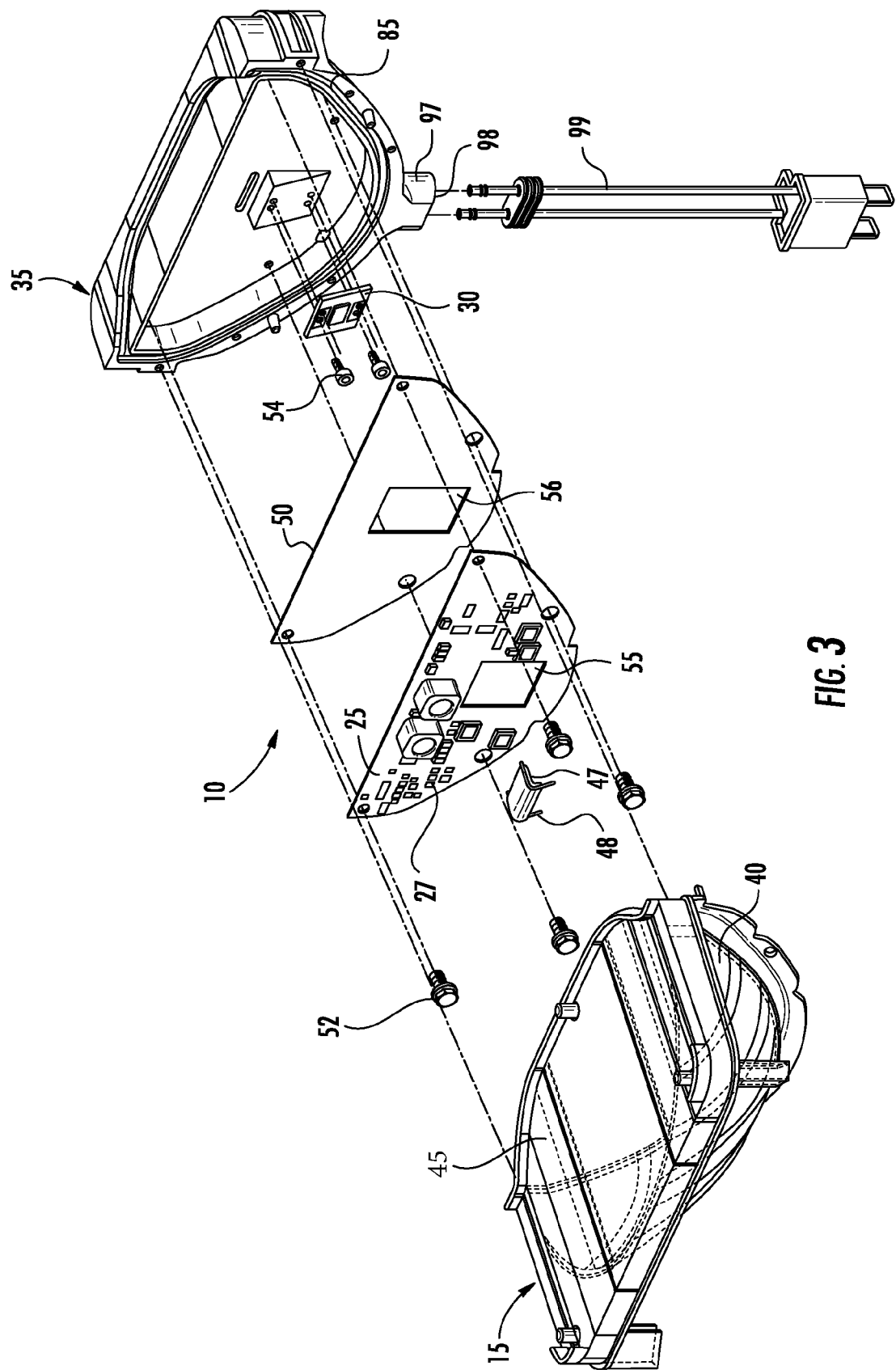
FIG. 3 is an exploded perspective view of a low beam headlamp according to one embodiment of the present invention.

FIG. 3 is an exploded perspective view of an individual headlamp 10. Headlamp 10, in this embodiment of the invention, is comprised of a reflector lens subassembly 15, a circuit board 25, light emitting diode assembly 30, and a heat sink structure 35. Reflector lens subassembly 15 includes a reflective portion 40 and a light transmissive portion 45. Circuit board 25 includes electrical components, generally indicated at 27, and is electrically connected to light emitting diode assembly 30 with BUSS bar 47. A thermal material, such as thermal pad 50 (i.e. GAP pad), is positioned between a bottom side of circuit board 25 and heat sink structure 35 in order to improve thermal contact between the electrical components 27 and heat sink structure 35.

BUSS bar 47 includes thermal stampings that contact light emitting diode assembly 30 at a first end and circuit board 25 at a second end, thereby forming an electrical connection between light emitting diode assembly 30 and circuit board 25. Thermal stampings, one of which is indicated at 48, extending from the first end of buss bar 47 may be soldered to first light emitting diode assembly 30. An overmold (not separately labeled) is positioned over thermal stampings 48 to insulate thermal stampings from heat sink structure 35, which is formed of a conductive material. As noted above, first ends and second ends of buss bar 47 are left uncovered to provide the necessary electrical contacts. In one embodiment, thermal stampings 48 are made of tin plated brass. Circuit board 25 and thermal pad 50 may be secured to heat sink structure 35 by attachment means such as fasteners 52. Further, additional fasteners 54 may be used to secure light emitting diode assembly 30 to heat sink structure 35. Cut-out portions 55 and 56 are formed in circuit board 25 and thermal pad 50 for positioning over LED assembly 30, as shown in FIG. 3.

Light emitting diode assembly 30 may be, for example, a 1×2 Altilon LED Assembly manufactured by Philips Lumiled. Alternate light emitting diodes or light emitting diode assemblies may be used. A thermally conductive compound (not shown) may be positioned between heat sink structure 35 and a light emitting diode assembly 30. The thermally conductive compound may be a material such as thermal grease, phase change material, thermal epoxy, or thermal tape.

Figure 4:
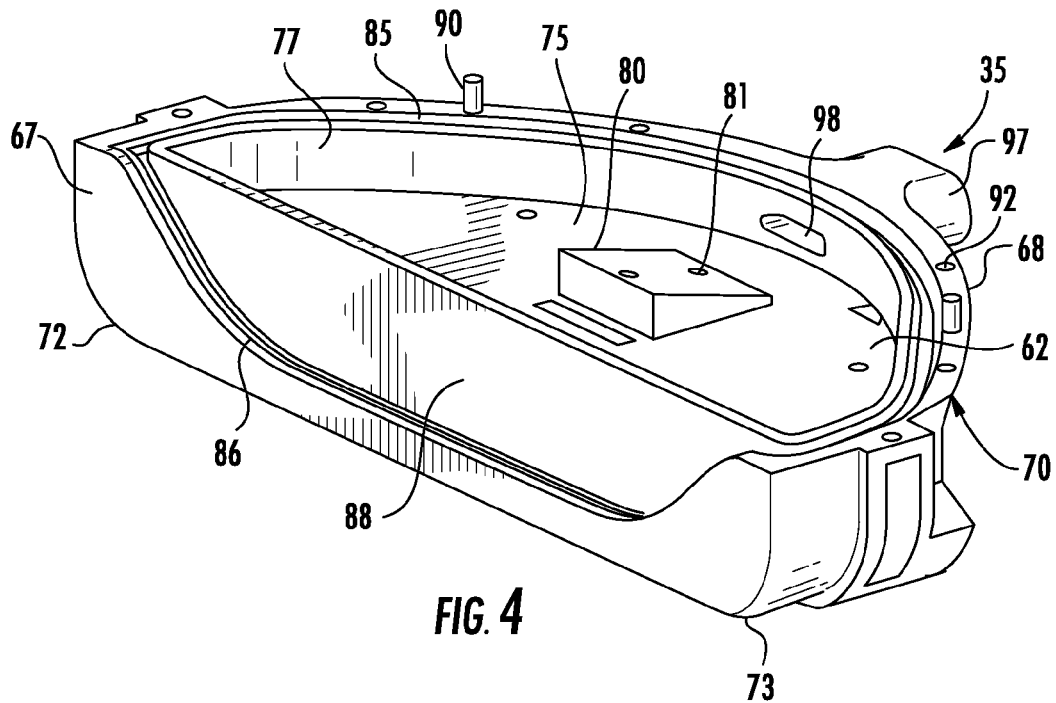
FIG. 4 is a perspective view of an inner side of a heat sink structure of the headlamp of FIG. 3.
Figure 5:
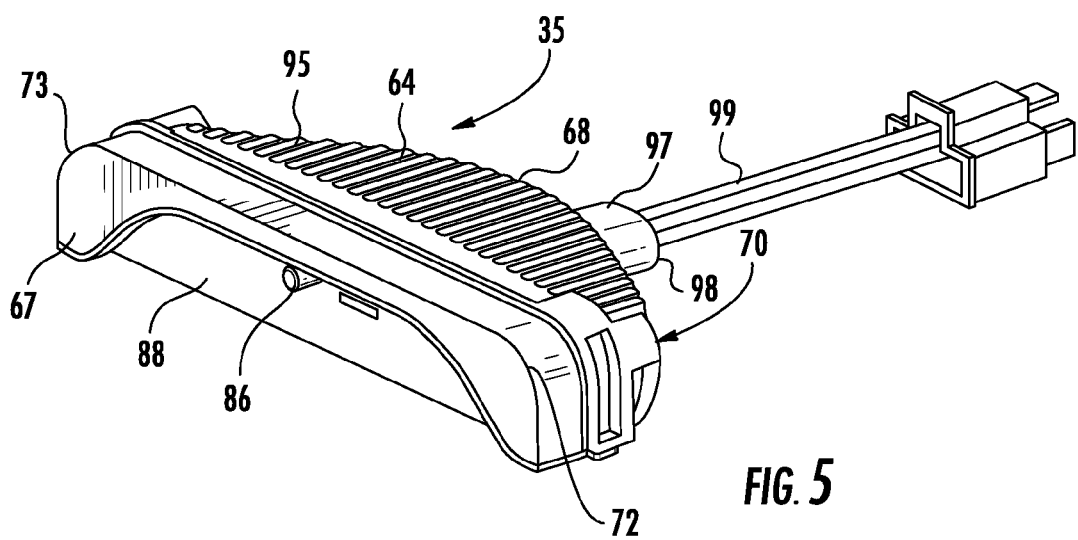
FIG. 5 is a perspective view of an outer side of the heat sink structure of FIG. 4.

FIGS. 4-5 are perspective views of heat sink structure 35. Heat sink structure 35 includes an inner side 62, an outer side 64, a front edge 67, a curved back edge 68 and a perimeter 70. In the embodiment shown, curved back edge 68 is generally C-shaped and meets front edge 67 at corners 72 and 73 to collectively form perimeter 70, which defines the edges of heat sink structure 35. Inner side 62 is a planar surface 75 surrounded by an upstanding wall 77. An alignment feature, such as wedge 80, is formed on planar surface 75 for providing a mounting surface for light emitting diode assembly 30. Alignment posts or holes 81 may be formed on wedge 80 to cooperate with fasteners 54 to secure light emitting diode assembly 30 to heat sink structure 25. Wedge 80 is configured to position light emitting diode assembly 30 at an angle relative to the horizontal axis of the headlamp. In the embodiment shown, wedge 80 is configured to tilt light emitting diode assembly 30 at about fifteen (15) degree angle from the horizontal axis of the headlamp. Planar surface 75 is parallel to the horizontal axis of the headlamp; thus, light emitting diode assembly 30 is also tilted approximately fifteen degrees from planar surface 75 of heat sink structure 35. An acceptable incline of wedge 80 and tilt of light emitting diode assembly 30 may be about +/−2 degrees of fifteen degrees in the embodiment illustrated. The tilt or angle of light emitting diode assembly 30 is necessitated by the optical prescription of lens reflector subassembly 15. Although the embodiments shown include a wedge portion of the heat sink providing an angled surface for the light emitting diode, additional embodiments my exist wherein a larger portion, the entire planar surface, or even the entire heat sink may be angled to accommodate the mounting of the light emitting diode.

Heat sink structure 35 also includes a circumferential groove 85 formed therein for engaging reflector lens subassembly 25 for sealing headlamp 10. Circumferential groove 85 is formed between upstanding wall 77 and perimeter 70. A recessed portion 86 is formed in front edge 67 of perimeter 70 whereby a front wall 88 of upstanding wall 77 is visible. Mating features, including posts 90 and apertures 92 are formed within a top edge of perimeter 70 to further facilitate attachment of reflector lens subassembly 25 to heat sink structure 35.

As illustrated in FIG. 5, outer side 64 of heat sink structure 35 includes grooves or fins 95 formed therein to facilitate the dissipation of heat. A projection 97 with wire opening 98 extending therethrough is also formed along curved back wall 68 of heat sink structure 35 to guide wires 99. Heat sink structure 35 is formed from a thermally conductive material such as die cast aluminum, copper or magnesium. In addition, heat sink structure 35 may be treated with a black thermally emissive coating to facilitate heat transfer through radiation. The coating may be an E-coat, an anodized coating, or a powder coat.

Figure 6:
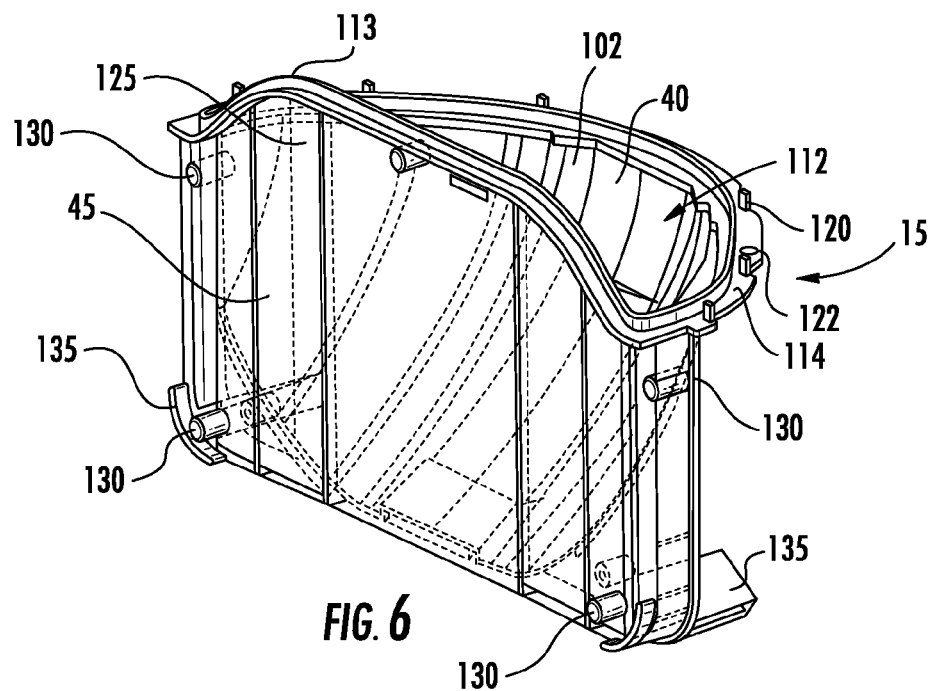
FIG. 6 is a perspective view of a reflector lens subassembly.

As illustrated in FIG. 6, lens reflector subassembly 15 includes reflector portion 40 and light transmissive portion 45. In the embodiment illustrated, reflector lens subassembly 15 is a single component formed by integrally molding reflector portion 40 as a single piece with light transmissive portion 45. In another embodiment, reflector portion 40 and light transmissible portion 45 may be separately formed. Reflector lens subassembly 15 may be formed of a thermoplastic or thermoset vacuum metalized material. For example, reflector portion 40 may be formed of ULTEM, polycarbonate, or a bulk molding compound. In particular, an optically clear plastic material is used for molding the reflector lens subassembly 15. An exterior coating may be applied to aid in protecting the reflector lens subassembly 15 from degradation caused by the environment.

Reflector portion 40 has a reflective surface for redirecting light from light emitting diode assembly 30 towards light transmissive portion 45. In one embodiment, reflector portion 40 includes interior facets 102 that are metallized to create a beam pattern. In the embodiment shown, reflector portion 40 is constructed of a metalized thermoplastic material. Specifically, lens reflector subassembly 15 is a single piece of molded polycarbonate plastic that is subsequently metalized on reflector portion 40 with aluminum. In alternate embodiments, reflector portion 40 can be constructed of a naturally reflective material, or can be coated with other reflective materials, such as white or silver paint. A complex reflector optic design including multiple intersecting segments may be used. The segments intersect at points that may be profound and visible or blended to form a uniform single surface.

Light transmissive portion 45 is a lens with at least one optical surface for directing light emitted from light emitting diode assembly 30. Optical elements may be formed within light transmissive portion 45 according to achieve the required optical prescription for low bean or high beam headlamps.

Reflector lens subassembly 15 is generally pocket-shaped, being defined by the curved reflector portion 40 adjoining the generally planar light transmissive portion 45. An upper open end 112 of reflector lens subassembly 15 includes an upstanding rim 113 and a laterally extending flange 114. Upstanding rim 113 engages groove 85 of heat sink structure. Further, laterally extending flange 114 includes alignment features, such as posts 120 and apertures 122 for engaging corresponding posts 90 and apertures 92 formed within perimeter 70 of heat sink structure 35 to provide a snap-fit between reflector lens subassembly 15 and heat sink structure 35.

Figure 7:
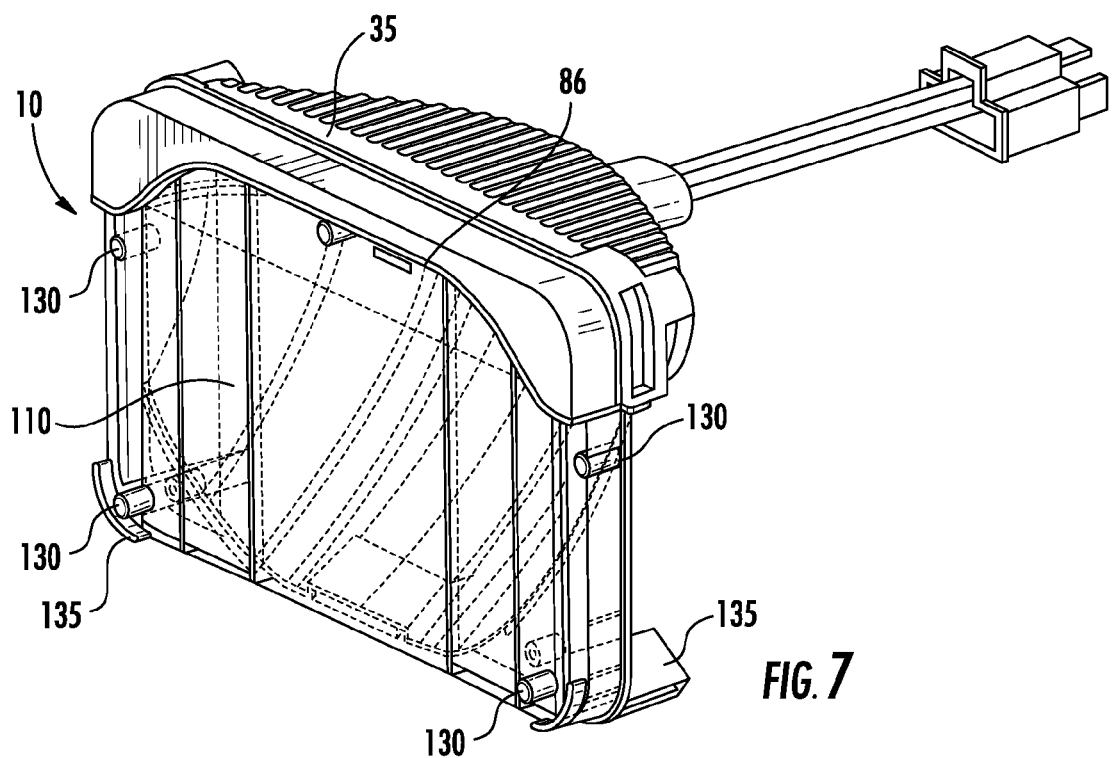
FIG. 7 is a perspective view of an assembled headlamp according to an embodiment of the invention.

As shown in FIG. 7, reflector lens subassembly 15 also includes a curved upper section 125 formed in light transmissive portion 45 which corresponds to recessed portion 86 of heat sink structure 35. The above-described elements are collectively described as mating features used to facilitate proper attachment of heat sink structure 35 and reflector lens subassembly 15, thereby ensuring proper alignment of light emitting diode assembly 30 with respect to reflector portion 40 and light transmissive portion 45.

Further, light transmissive portion 45, as well as the overall lens reflector subassembly 15, functions to form a cover for headlamp 10, defining a three-dimensional space 110 between heat sink structure 35 and lens reflector subassembly 15. In addition to attachment via the mating features, reflector lens subassembly 15 is permanently or hermetically sealed to heat sink structure 35 with an adhesive that additionally functions as a sealant. For example, one of ordinary skill in the art will readily appreciate that any RTV silicone or urethane can be used as the adhesive.

Headlamp 10 also includes attachment features to facilitate the mounting of headlamp 10 to vehicle 1. In general, headlamp 10 is mounted to a vehicle through the use of bucket assemblies, as is known in the art. Attachment features, such as apertures 130 and tabs 135, are formed within lens reflector subassembly 15 to aid in attaching headlamp 10 to a vehicle 1.

When headlamp 10 is mounted within a vehicle 1, as shown in FIG. 1, heat sink structure 35 is exposed to the outside air, thereby allowing heat generated by headlamp 10 to be transferred to the outside air. Further, as discussed with reference to FIG. 5, a plurality of cooling fins 95 are disposed on outer side 64 of heat sink structure 35 to enhance the transfer of the heat generated by light emitting diode assembly 30. Thus, the temperature of light emitting diode assembly 30 and space 110 are kept sufficiently cool to prevent degradation of headlamp 10.

Figure 8:
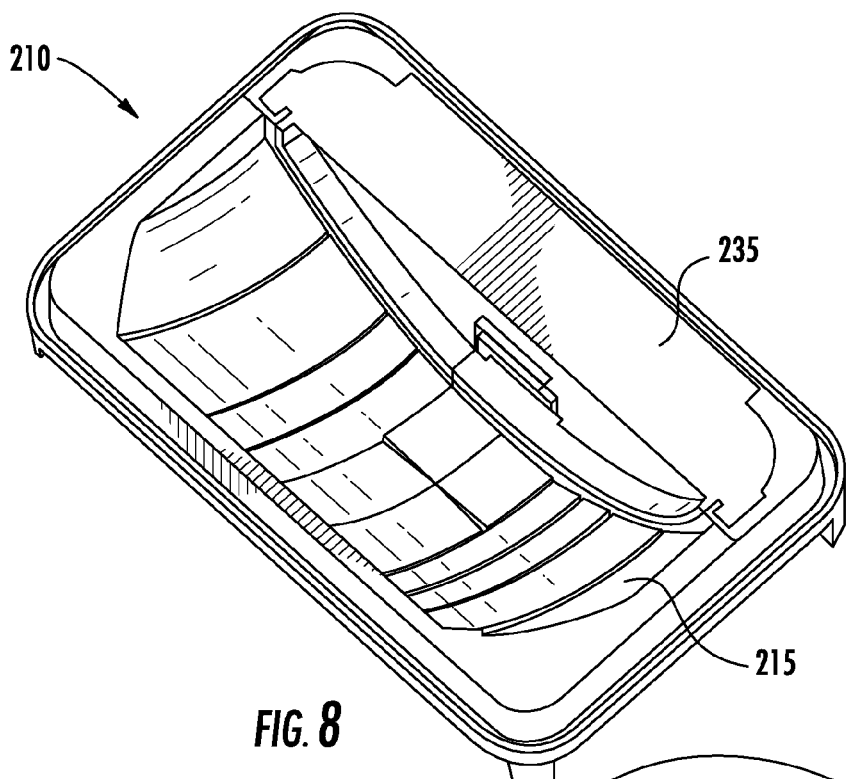
FIG. 8 is an alternate embodiment of a headlamp.

In an alternate embodiment, as shown in FIG. 8, a headlamp 210 is formed via insert molding. In this embodiment, a reflector subassembly 215 is formed around a heatsink structure 235, which includes elements corresponding to heatsink structure 35.

Figure 9:
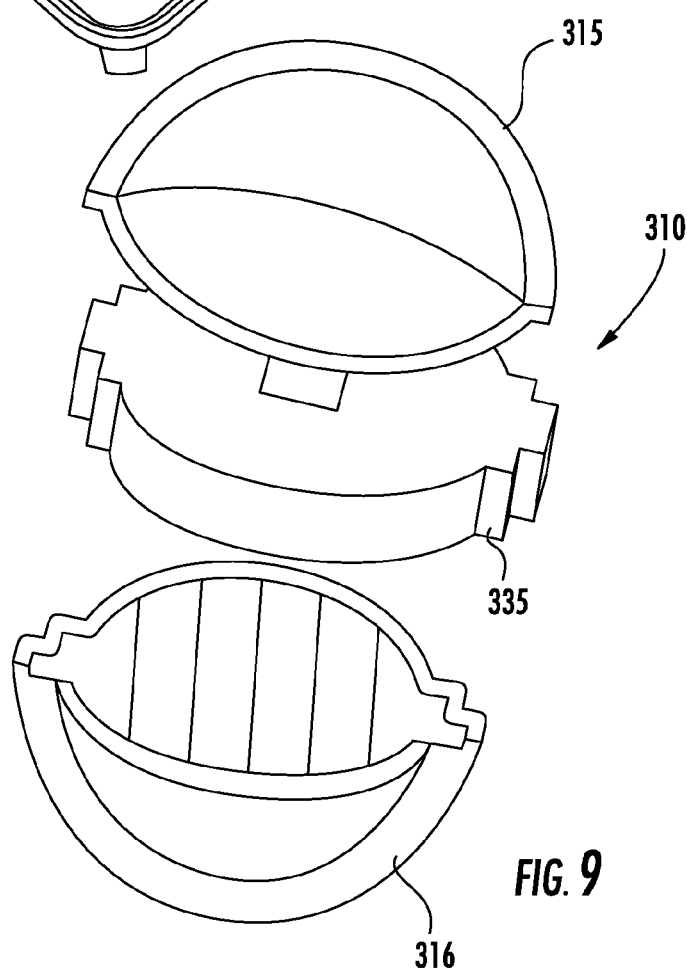
FIG. 9 is an additional alternate embodiment of a headlamp.

In a further embodiment, as shown in FIG. 9, an additional headlamp 310 is illustrated having a heat sink structure 335 and upper and lower reflector lens subassemblies 315, 316. Reflector lens subassemblies 315 and 316 each include a clear polycarbonate lens portion and a reflective surface having metalized optical surfaces molded therein.

Although the embodiments of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A headlamp, comprising:
   at least one light emitting diode;
   a circuit board electrically connected to the light emitting diode;
   a heat sink structure including a planar surface and an alignment feature for positioning said at least one light emitting diode at an angle offset from the planar surface of the heatsink structure; and
   a reflector lens subassembly including a curved reflector portion adjoined to a planar light transmissive portion, said reflector portion having a reflective surface for redirecting light from the light emitting diode towards the light transmissive portion, said reflector lens subassembly adapted to engage the heat sink structure to define a sealed three-dimensional space within the headlamp.

2. The headlamp of claim 1 wherein the at least one light emitting diode is positioned at an angle approximately 15 degrees from the planar surface.

3. The headlamp of claim 1 wherein the headlamp is a four inch by six inch sealed-beam headlamp.

4. The headlamp of claim 1, wherein the heat sink structure is made of anodized black die-cast aluminum to facilitate thermal emissivity.

5. The headlamp of claim 1 wherein the heat sink structure includes an outer side, an inner side, a first edge, a second edge and a perimeter, and said reflector lens subassembly engages said heat sink structure at the perimeter.

6. The headlamp of claim 5, wherein the perimeter of the heat sink structure includes a groove formed therein for engaging the reflector lens subassembly and sealing said headlamp.

7. The headlamp of claim 6 wherein the reflector lens subassembly includes an upper rim with alignment features for engaging the perimeter of the heat sink structure to facilitate positioning of the at least one light emitting diode with respect to the reflector lens subassembly.

8. The headlamp of claim 1 wherein the alignment feature is a wedge formed on said inner side of the heat sink structure.

9. A headlamp, comprising:
   at least one light emitting diode;
   a circuit board electrically connected to the light emitting diode;
   a heat sink structure including an outer side, an inner side having a planar surface, a first edge, a second edge and a perimeter, said inner side including a wedge formed thereon for positioning said at least one light emitting diode at an angle offset from the planar surface of the heatsink structure by approximately 15 degrees; and
   a reflector lens subassembly including a reflector portion and a light transmissive portion, said reflector portion having a reflective surface for redirecting light from the light emitting diode assembly towards the light transmissive portion, said reflector lens subassembly including an upper rim with alignment features for engaging the perimeter of the heat sink structure to define a sealed three-dimensional space within the headlamp and to facilitate positioning of the at least one light emitting diode with respect to the reflector lens subassembly.

10. The headlamp of claim 9 wherein the headlamp is a four inch by six inch sealed-beam headlamp.

11. The headlamp of claim 9, wherein the heat sink structure is made of anodized black die-cast aluminum to facilitate thermal emissivity.

12. The headlamp of claim 9, wherein the perimeter of the heat sink structure includes a groove formed therein for engaging the upper rim of the reflector lens subassembly and sealing headlamp assembly.

13. In a headlamp comprising a light emitting diode, a circuit board electrically connected to the light emitting diode, and a heat sink structure, a reflector lens subassembly comprising: a reflector portion and a light transmissive portion, said reflector portion having a reflective surface for redirecting light from the light emitting diode assembly towards the light transmissive portion, said reflector lens subassembly including an upper rim with alignment features for engaging the perimeter of the heat sink structure to define a sealed three-dimensional space within the headlamp and to facilitate positioning of the at least one light emitting diode with respect to the reflector lens subassembly.

14. The headlamp of claim 1 wherein the reflector lens subassembly is a single component formed by integrally molding reflector portion as a single piece with the light transmissive portion.

15. The headlamp of claim 1 wherein the reflector portion includes interior facets that are metallized to create a beam pattern.

16. The headlamp of claim 1 wherein the reflector lens subassembly is pocket-shaped, being defined by the curved reflector portion adjoining the generally planar light transmissive portion.

17. The headlamp of claim 1 wherein the reflector lens subassembly includes an upstanding rim and a laterally extending flange with upstanding rim engaging the groove of heat sink structure and said laterally extending flange including posts or apertures for engaging corresponding posts and apertures formed within a perimeter of the heat sink structure to provide a snap-fit between reflector lens subassembly and heat sink structure, thereby ensuring proper alignment of light emitting diode assembly with respect to reflector portion and light transmissive portion.

18. The headlamp of claim 1 wherein the heat sink structure has edges that fold over the rim of said reflector lens subassembly.

19. The headlamp of claim 9 wherein the reflector lens subassembly includes an upstanding rim and a laterally extending flange with upstanding rim engaging the groove of heat sink structure and said laterally extending flange including posts or apertures for engaging corresponding posts and apertures formed within a perimeter of the heat sink structure to provide a snap-fit between reflector lens subassembly and heat sink structure, thereby ensuring proper alignment of light emitting diode assembly with respect to reflector portion and light transmissive portion.

20. The headlamp of claim 13 wherein the reflector lens subassembly includes an upstanding rim and a laterally extending flange with upstanding rim engaging the groove of heat sink structure and said laterally extending flange including posts or apertures for engaging corresponding posts and apertures formed within a perimeter of the heat sink structure to provide a snap-fit between reflector lens subassembly and heat sink structure, thereby ensuring proper alignment of light emitting diode assembly with respect to reflector portion and light transmissive portion.

* * * * *